Figure 1:
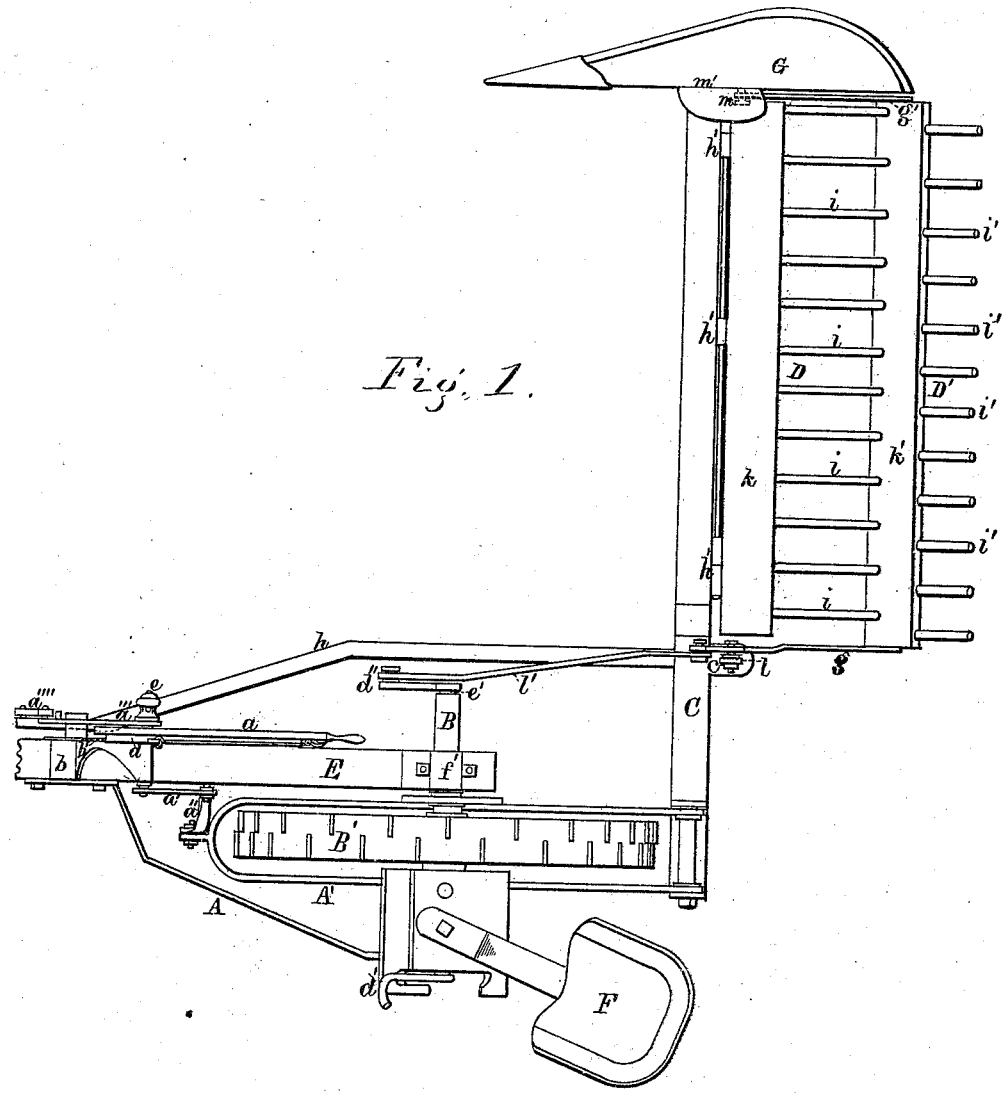

2 Sheets—Sheet 1.

B. C. CONVERSE & A. SMITH.
HARVESTER.

No. 174,119. Patented Feb. 29, 1876.

Attest.
A. Bradford.
Wm. C. Frye.

Inventors.
Bolivar C. Converse
Amos Smith

2 Sheets—Sheet 2.
B. C. CONVERSE & A. SMITH.
HARVESTER.
No. 174,119. Patented Feb. 29, 1876.
Fig. 2.
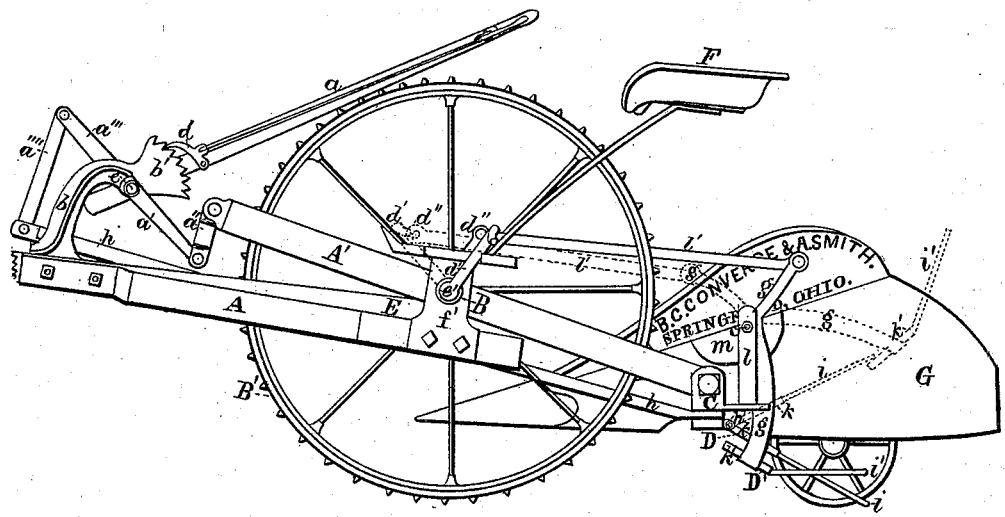
Fig. 3.
Fig. 4.
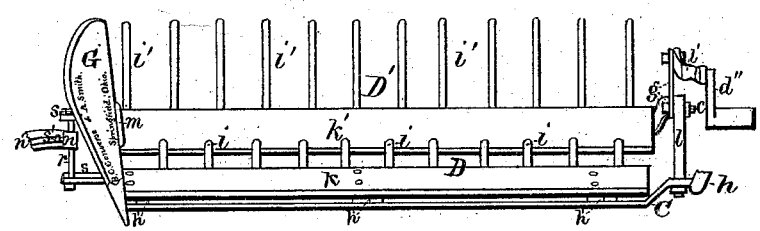
Attest.
A. Bradford
Wm. C. Frye
Inventors.
Bolivar C. Converse,
Amos Smith

UNITED STATES PATENT OFFICE.

BOLIVAR C. CONVERSE AND AMOS SMITH, OF SPRINGFIELD, OHIO.

IMPROVEMENT IN HARVESTERS.

Specification forming part of Letters Patent No. 174,119, dated February 29, 1876; application filed April 21, 1875.

*To all whom it may concern:*

Be it known that we, BOLIVAR C. CONVERSE, of the city of Springfield, county of Clarke and State of Ohio, and AMOS SMITH, of the same city, county, and State, have jointly invented certain Improvements in Harvesters, of which the following is a specification:

Our invention is shown in a single-wheeled harvester, though our improvements are alike applicable to a two-wheeled machine.

The object of our invention is to instantaneously reduce the bearing-surface of a dropper to the least possible limit in discharging its grain. This we accomplish by making our dropper in two sections, which we call racks, each one being composed of a narrow strip or bar of wood or metal parallel with the cutter-bar, and provided with teeth projecting from its rear edge. One of these racks is hinged, by its front edge, to the rear edge of the cutter-bar, so that its teeth can drop down into the stubble to a considerable inclination; and the other rack or section is suspended from points above it by levers fastened to its ends, so that, in the operation of discharging or freeing itself from the cut grain, it shall lap or pass entirely under the former. The levers by which it is suspended stand obliquely forward from the plane of its surface, so that, when down, it will be at about the same inclination as the one which overhangs it. The suspending-lever, at the end of the rack next the machine, is pivoted to a post on the cutter-bar, or a lug extending from the same. It extends above its pivoted point far enough to form a lever, by which it is raised, the pivot-bolt being the fulcrum. The lever suspending the rack at the other end is pivoted near the top of the grain or divider board, in line with the former. This rack, being suspended by radial levers, has a circuitous movement when rising, and as it is drawn out from under the hinged rack the teeth of the latter are raised with it until the two racks are elevated high enough to receive the cut grain. When released the dropper-racks fall by their own gravity. This manner of lapping or passing the sections of the dropper one under the other, so as to reduce their surface suddenly to a mere line in the direction of the length of the straw, we believe to be new. Two objects are attained by it—*i. e.*, that of having the grain deposited upon the stubble, with its butts even and square, and of dispensing entirely with a cut-off or dividing-rod.

Figure 1, Sheet 1, is a plan view of a one-wheeled harvester with our improvements. The dropper is shown elevated, as in position for receiving the cut grain. Fig. 2, Sheet 2, is a side elevation of the same. The dropper is shown when down, as in discharging the grain. It is also shown in dotted lines, as when raised. Fig. 3 is a front view of the dropper with its connections, seen from a level with the cutter-bar. Fig. 4 is a longitudinal section of the wheel-axle in a one-wheeled harvester, and the crank-shaft extending through it, showing the most direct connection for operating the dropper with foot-lever $d'$.

D and D$'$ are the two sections or racks which form the dropper. Rack D is hinged to cutter-bar C by hinges $h$ $h$. It is entirely dependent upon rack D$'$ for all its movements. It is raised to the proper position to receive the cut grain by it, is supported by it when raised, and falls only when the latter swings or passes under it.

In some machines the rack D, instead of being hinged directly to the cutter-bar, may be journaled or pivoted at each end of its bar $k$ in lugs or bearings extending from it, or from parts attached to it. It should be so hinged or pivoted as to allow its upper surface to be about on a level with the top of the cutter-bar when raised.

$i$ $i$ $i$ are teeth projecting from the bar $k$ of rack or section D. These are on the same plane with it. D$'$ is the swinging section or rack of the dropper, having similar teeth projecting from the rear edge of its bar $k'$. These are shown bent slightly upward, though we use them straight, as in rack D, except in long heavy grain. $g$ $g'$ are the levers by which rack D$'$ is suspended. By preference a single bar of iron is used in forming both levers, which extends along the under side of bar $k$ its entire length, being bolted to it, and is turned up at the ends for that purpose, this construction giving greater strength to the rack. Bar $k$ is slightly shorter than $k'$ to allow levers $g$ $g'$ to pass its ends. The levers $g$ $g'$ are bent forward, so as to elevate the back edge of bar $k'$ when the droppers are down, as shown in Fig. 2, both bars $k$ and $k'$ being at the same inclination in discharging the grain. Lever $g$ is pivoted to the top of post $l$ by pivot-bolt $c$, and lever $g'$ is pivoted to the divider or grain-board G, near its top edge, by the pivot-bolt $m$. The latter is seen in dotted lines under a sheet-metal shield, $m'$, which hangs over it to prevent the straw from being entangled about the same.

The dropper can be operated through any of the ordinary connections by a foot or hand lever from the driver's seat. The most direct connection is preferred, such as is shown in the one-wheeled harvester illustrated in the drawings. (See Fig. 4.)

A shaft, $e'$, extends through the hollow axle B, with foot-lever $d'$ on its outside end and crank $d''$ on its inside end. The latter is connected to the top of lever $g$ by rod $l$, with either a crank-wrist or pivot-bolt. Foot-lever $d'$, crank $d''$, and that part of lever $g$ above the top of post $l$ all stand inclined backward at about the same angle when the dropper-racks are down, as seen in Fig. 2. On pressing the foot-lever $d'$ forward quickly, as the dropper is operated, the suspended section D' is instantly elevated, bringing up the teeth of section D as it moves backward and upward under them, until the position for receiving the cut grain is reached, as shown in Figs. 1 and 3; also in dotted lines, Fig. 2.

The distance which the teeth of the hinged section D laps onto bar K' of the suspended section D', when the racks are elevated, varies with the different kinds of grain, being from one and a half inches to six. In cutting flax bars $k$ and $k'$ are only about three inches apart, while in long heavy wheat or rye they may be six inches apart, allowing the teeth of rack D to lap onto bar $k'$ about two inches.

We disclaim a single dropper hinged to a cutter-bar.

We claim—

1. A dropper for harvesters which discharges by its own gravity, made in two sections, one of which laps or passes under the other moving in the arc of a circle, the plane of which cuts the plane of the cutter-bar at right angles to its length.

2. A dropper for harvesters made of two bars extending parallel with the cutter-bar, (each provided with teeth,) which, when falling by their own gravity, lap or pass one under the other, for the purpose of instantaneously reducing their bearing-surface in discharging the cut grain, as shown and specified.

3. Section D', with its bar $k'$ and teeth $i'$ $i'$ $i'$, provided with levers $g$ $g'$ at each end thereof, for suspending the same from pivots $c$ and $m$, so that when down it shall hang under the hinged section D, below the level of the cutter-bar C, as shown and described, for the purpose set forth.

4. In combination, section D', with its bar $k'$, teeth $i'$ $i'$ $i'$, levers $g$ $g'$, pivots $c$ and $m$, post $l$, and grain-board G, as and for the purpose hereinbefore set forth.

5. In combination, the cutter-bar C, its hinged section D, post $l$, and grain-board G, with their pivots $c$ and $m$, a suspended or swinging section, D', supported by arms or levers $g$ $g'$ extending from its ends, or formed by a single bar extending the entire length of the same, and attached thereto obliquely to the plane of its surface, so as to lower the teeth and rear edge of said bar and raise the front edge of the same, to allow it to fold under the hinged section D at an inclination parallel therewith, in discharging the grain, as shown and specified.

6. In a dropper for harvesters, made of two parts or sections, the arrangement of a hinged section to the cutter-bar and a suspended section pivoted above it, in such relation thereto that it shall fold or pass under it when depressed for discharging the grain, and elevate it when raised for receiving the same, substantially as shown and described.

7. The construction and arrangement of a dropper in two parts or sections, one of which is hinged to the cutter-bar and the other so suspended that when it drops it shall pass entirely under the hinged section, allowing the teeth of the latter to fall suddenly to the ground, thereby wholly withdrawing the supporting-surface and clearing itself of the grain, as shown and specified.

8. A dropper-rack hinged to the cutter-bar of a harvester, adapted to be automatically operated by an accessory dropper-rack, substantially as shown and specified.

9. The means of operating said dropper D and D', consisting of the foot-lever $d'$, shaft $e'$, crank $d''$, connecting lever or rod $l$, pivoted levers $g$ $g'$, in combination with the hollow axle B, post $l$, cutter-bar C, hinges $h$ $h$, and divider G, as and for the purpose set forth.

BOLIVAR C. CONVERSE.
AMOS SMITH.

Attest:
A. BRADFORD,
WM. C. FRYE.